United States Patent [19]

Previati

[11] 4,115,510
[45] Sep. 19, 1978

[54] PROCESS AND APPARATUS FOR CURING ELASTOMERIC CONVEYOR BELTS AND THE LIKE

[75] Inventor: Augusto Previati, Milan, Italy
[73] Assignee: Industrie Pirelli S.p.A., Milan, Italy
[21] Appl. No.: 742,245
[22] Filed: Nov. 16, 1976
[30] Foreign Application Priority Data
Nov. 27, 1975 [IT] Italy .................. 29692 A/75
[51] Int. Cl.² .................. B29H 5/01; B29H 7/22
[52] U.S. Cl. .................. 264/347; 156/137; 156/140; 264/326
[58] Field of Search .................. 264/236, 347, 326; 156/137, 140

[56] References Cited
U.S. PATENT DOCUMENTS

| | | | |
|---|---|---|---|
| 3,607,561 | 9/1971 | Hutz | 156/137 |
| 3,619,332 | 11/1971 | Bongers | 156/137 |
| 3,779,845 | 12/1973 | Hutz | 156/137 |
| 3,860,684 | 1/1975 | Vance | 264/236 |

*Primary Examiner*—Willard E. Hoag
*Attorney, Agent, or Firm*—Stevens, Davis, Miller & Mosher

[57] ABSTRACT

An elastomeric composition is shaped into a conveyor belt and cured in three steps. In the first step the uncured composition is heated to the curing temperature of the elastomer and pressed at a pressure which is at least equal to the vapor pressure of volatile constituents in the composition to avoid bubbles but less than 6 kg/cm² until the composition becomes plastic. At this point, the pressure is increased to about 6 to 10 kg/cm² to shape the composition into the configuration of a conveyor belt while maintaining the temperature of the composition at the curing temperature of the elastomer. In a third step, the pressure is reduced to a pressure of not less than the vapor pressure of volatile constituents of the composition and less than 6 kg/cm² while maintaining the temperature of the composition at the curing temperature of the elastomer until the elastomer is cured.

6 Claims, 7 Drawing Figures

PROCESS AND APPARATUS FOR CURING ELASTOMERIC CONVEYOR BELTS AND THE LIKE

The present invention relates to a process for curing conveyor belts and the like made of elastomeric material, and a device having an improved flat-platen press for carrying out the curing process.

Processes for curing conveyor belts and the like made of elastomeric material are known, and devices for carrying into effect the known process are also known. Such curing processes for conveyor belts involve a phase of heating successive tracts of the conveyor belt and at the same time subjecting the heated tract to a constant pressure.

Depending on the pressure utilized, the known processes can be divided accordingly into two types. In the first type curing is achieved at a low and constant pressure having an order of magnitude of 5 kg/cm$^2$. In the second type of process, curing is effected at a high and constant pressure having an order of magnitude of 40 kg/cm$^2$. The processes of the first type have the drawback of having a low productivity and of at times requiring the use of special compounds.

Apparatus suitable for carrying into effect the processes of the first type are known to technicians of the field under the name of "rotocure", and they consist of a heating cylinder, of a pressure belt (normally metallic) and of a series of rollers for moving the metallic pressure belt in a way so that the metallic pressure belt exerts a pressure against a part of the revolving surface of the heating cylinder.

The uncured conveyor belt passes continuously between the heating roller and the metallic pressure belt, getting heated while it is being subjected to a constant pressure and it comes out cured.

The rotocure device has the following drawbacks:

(1) the productivity of the device is very low since it is not possible to use heating cylinders having large diameters because of the prohibitive stresses to which the metallic pressure belt is subjected for guaranteeing a pressure of 5 kg/cm$^2$; and (2) the metallic pressure belt because of the notable stresses to which it is subjected, has a relatively short service life span.

The processes of the second type sometimes have the drawback of introducing into the conveyor belts certain defects such as alterations in the arrangement of the tension resistant structure which can shorten its life span.

The devices for carrying out the processes of the second type consist of a flat-platen through which the conveyor belt to be cured is made to pass, with an intermittent motion.

The flat-platen press allows for a high productivity, however, it presents the following drawbacks:

(1) since the pressures involved during the curing process are high, there sometimes exists a danger of provoking alterations in the arrangement of the tension resistant structure of the conveyor belt; on the other hand, it is not possible to use low pressures for the whole curing period since it has been experimentally verified that bubbles or other imperfections form in the body of the conveyor belt;

(2) the press platens, for working at high pressures, have to be very sturdy and, hence, rather heavy; this fact causes grave problems, both for executing the foundation of the said press platens, as well as for the hydraulic installations connected with them; and (3) these flat-platen presses are very costly.

An object of the present invention is to eliminate the disadvantages of the known curing processes for conveyor belts by employing a curing process which operates at different pressures, which has an increased productivity, and which does not produce any defects in the conveyor belt.

A further object of the present invention is to provide an apparatus for carrying out the curing process of the invention, which is devoid of the disadvantages of the known devices.

Other objects will become apparent from the following description with reference to the drawings wherein.

The objects of the present invention are accomplished by providing a process for curing conveyor belts and the like, made out of an elastomeric composition characterized in the fact that it comprises the three phases of:

(1) heating the uncured conveyor belt at the curing temperature of the elastomeric composition, subjecting it to a pressure of not less than the vapor pressure of the volatile substances present in the elastomeric composition, whereby the crude elastomeric material of the composition plastifies without forming bubbles, (2) maintaining the conveyor belt at the curing temperature of the elastomeric composition and increasing the applied pressure to a value between 6 and 10 kg/cm$^2$ and molding the elastomeric composition of the conveyor belt at a low pressure without provoking any danger of alterations in the arrangement of the tension resistant structure of the conveyor belt itself, and (3) while still maintaining the conveyor belt at the curing temperature of the elastomeric composition, subjecting the conveyor belt to a pressure of not less than the vapor tension of the volatile substances present in the elastomeric composition until the curing of the elastomeric composition is completed.

Another object of the present invention is to provide a device for curing conveyor belts having an improved flat-platen press and comprising two hot platens, parallel and overlapping each other, a plurality of frames disposed on sliding elements, each one provided with a central opening, the hot platens being inserted into this opening of the frames and one hot platen being fixed at the edge of the frame opening and the second hot platen being supported by pistons of piston-cylinder systems fixed on the edge of the frame opening, clamping means being provided upstream and downstream of the heated platens, for clamping, for displacing, and for tensioning the conveyor belt.

In accordance with the process of this invention, a conveyor belt made out of a crude elastomeric composition is heated to the curing temperature for the composition and subjected to a pressure which is at least equal to or slightly above the vapor tension or pressure of the volatile substances present in the elastomeric composition at the curing temperature, and left thus, for a period of time in order to obtain a good plasticity. The amount of pressure required on the conveyor belt in this phase of the process depends therefore, both on the nature of the volatile substances used for the elastomeric composition for making the belt and the curing temperature of the elastomer material itself, recognizing that the vapor tension of the volatile substances varies depending upon the curing temperature. Generally, it can be said that in this phase, the pressure which is exerted on the conveyor belt has a value of not less than 1 kg/cm$^2$, this being the minimum value of the vapor tension of the volatile substances of any compound at a temperature normally employed for curing elastomeric compositions. In general, the pressure used in this phase has an order of magnitude indicated by the vapor tension; i.e., 2 or 3 kg/cm$^2$. For the purpose of this application, this first phase of the process is referred to as the "pre-heating phase".

At this point, while maintaining the conveyor belt always at the curing temperature of the elastomeric composition which constitutes the conveyor belt, the pressure is increased to a value between 6 and 10 kg/cm$^2$. For the purpose of this application, this second phase of the process is referred to as the "formation or molding (the conveyor belt) phase".

After this second phase, while maintaining the conveyor belt at the curing temperature, pressure lower than that of the scond phase is applied; this pressure is practically equal to the pressure applied during the "preheating phase". For the purpose of this application, this third phase is referred to as the "completion of the curing phase".

The manner in which the pressure is applied in the phases of the process can vary and, depending on how the pressures are applied, variations can be obtained in the curing process.

According to one embodiment of the curing process, during the "pre-heating phase" the pressure is constant and equal to not less than 1 kg/cm$^2$. During the "formation or molding (of the conveyor belt) phase" the pressure is constant and equal to a value between 6 and 10 kg/cm$^2$. In the "completion of the curing phase" the pressure is reduced to the value of the "pre-heating phase". The pressure variation in the transition from one phase to another, therefore, is practically improvised, and the diagram of the pressure is in charted steps.

According to a second embodiment of the curing process, during the "pre-heating phase" the pressure increases linearly from the value of the vapor tension of the volatile substances present in the elastomeric composition to the pre-established pressure value for the "formation or molding of the conveyor belt phase". During the latter phase, the pressure is maintained constant and during the "completion of the curing phase" the pressure decreases linearly from the pre-established value for the "forming or molding phase" to the value of the vapor tensions of the volatile substances in the elastomeric composition.

From the preceding description, it is therefore apparent that the essential elements of the process of the present invention is constituted by the three phases, "pre-heating phase", "formation or molding phase", and the "completion phase", with their indicated characteristics of pressures and temperatures.

As regards the duration time of each of the three phases, this fact is not clearly definable, since curing time is a value which is subject to various factors, such as the nature of the elastomeric composition used and its curing temperature.

In any case, for a total curing time made equal to 1, experimental tests indicate that the times for each of the single phases are as follows:
"pre-heating phase" 0.2
"formation or molding phase" 0.5
"completion of curing phase" 0.3 .

As regards the elastomeric composition used for the conveyor belt, anyone known to the technician of this field can be used. For example one of these elastomeric compositions can be the following:

| | | |
|---|---|---|
| SBR 1500 | 100 | parts |
| ZnO | 5 | " |
| sulphur | 2 | " |
| stearic acid | 1 | part |
| accelerators | 1.5 | " |
| age resisters | 2 | parts |
| plasticizers | 5 | " |
| carbon black | 50 | " |

An apparatus is used for carrying out the process of the invention which has an improved flat-platen press provided with means which allow it to function according to the phases of the process described above.

Figure 1:
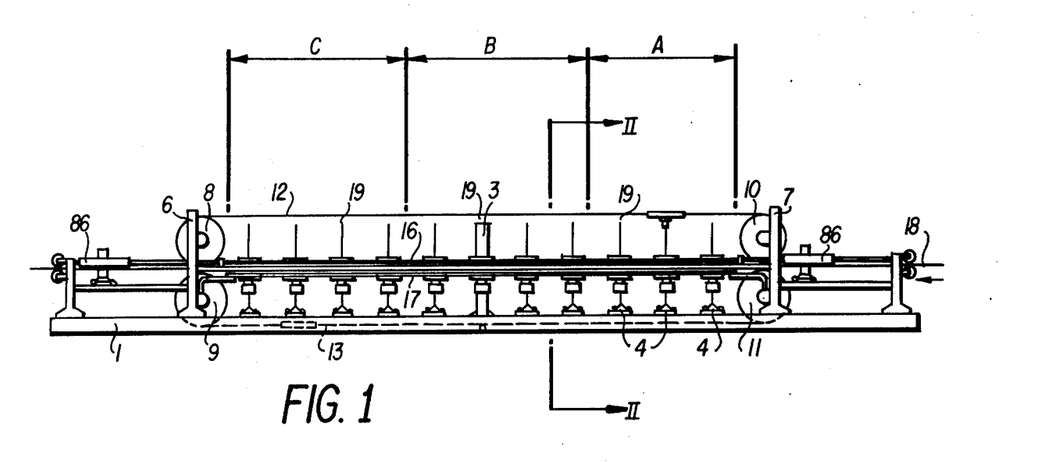
FIG. 1 shows a lateral view of an embodiment of a press provided by the invention.
Figure 2:
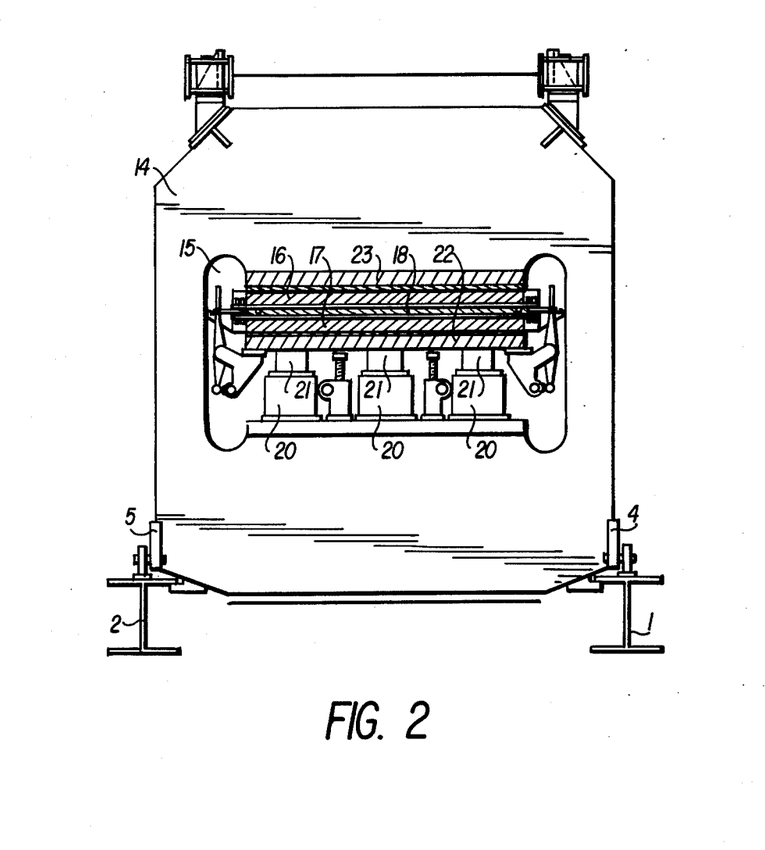
FIG. 2 shows a large scale section of the press taken along the line II—II of FIG. 1.

As can be seen in FIGS. 1 and 2, the improved flat-platen press, which is also an object of the present invention, has a pair of rails 1 and 2, anchored securely to the ground to which is attached a fixed frame 3, constituting the press central line, and on the rails 1 and 2 are placed a plurality of sliding elements consisting, for example, of trolleys or support members 4 and 5. Supports 6 and 7 are fixed to the rails and sustain the pair of idle rollers 8 and 9, and 10 and 11, respectively. An annular metallic belt 12 is subtended between the rollers 8 and 10 and an annular metallic belt 13 is subtended between the rollers 9 and 11. The trolleys 4 rest on rail 1 and the trolleys 5 rest on rail 2. The number of trolleys 4 and 5 are equal and they are placed so as to form pairs. The pairs of trolleys 4 and 5 support plate-frames 14. The frames 14 and 3 are provided with an opening 15, generally rectangular, into which are inserted two heated plates 16 and 17 constituting the flat-platen of the press. The two loops of the annular metallic belts 12 and 13 at their nearest point from one another pass between the heated plates 16 and 17 and sandwich between them the conveyor belt to be cured.

The upper loop of the annular metallic belt 12 passes over the frames 14 and 3 to rest on rollers 19 which are attached to frame 14 and 3. The lower part of belt loop 13 passes under the frames 14 and 3 at the level of trolleys 4 and 5.

Each frame 14 has in correspondence to the lower side of its own opening 15 (see FIG. 2) a series of cylinders 20 (in FIG. 2 three of these are shown) from which arise hydraulically actuated pistons 21, mechanically attached in a pre-established position by means of the sole plate 22 to the heated plate 17 which is the lower platen of the press.

On the upper side of the opening 15 of each frame, the heated plate 16, which is the upper platen of the press, is attached mechanically by means of the sole plate 23.

Figure 3:
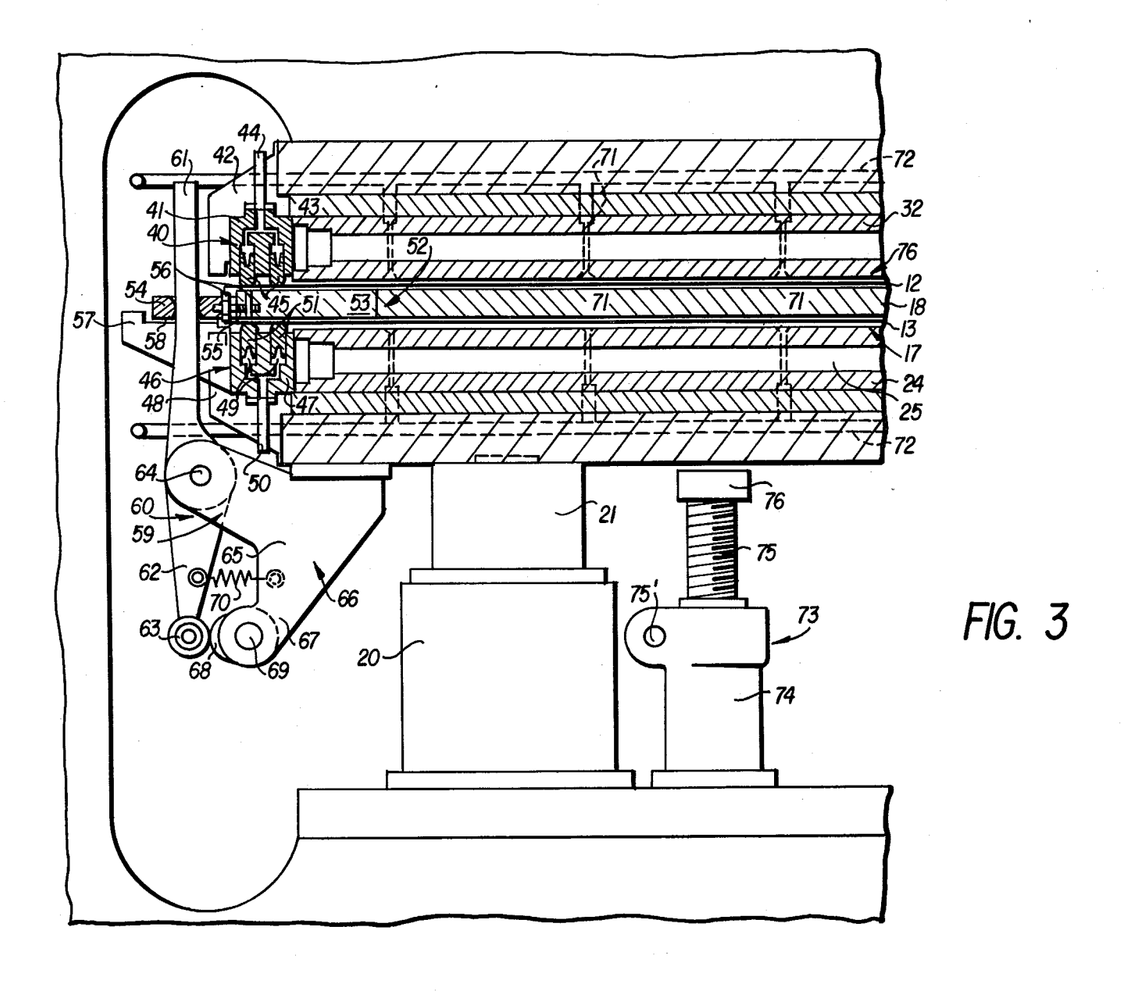
FIG. 3 shows a large scale view of a detail from FIG. 2.
Figure 4:
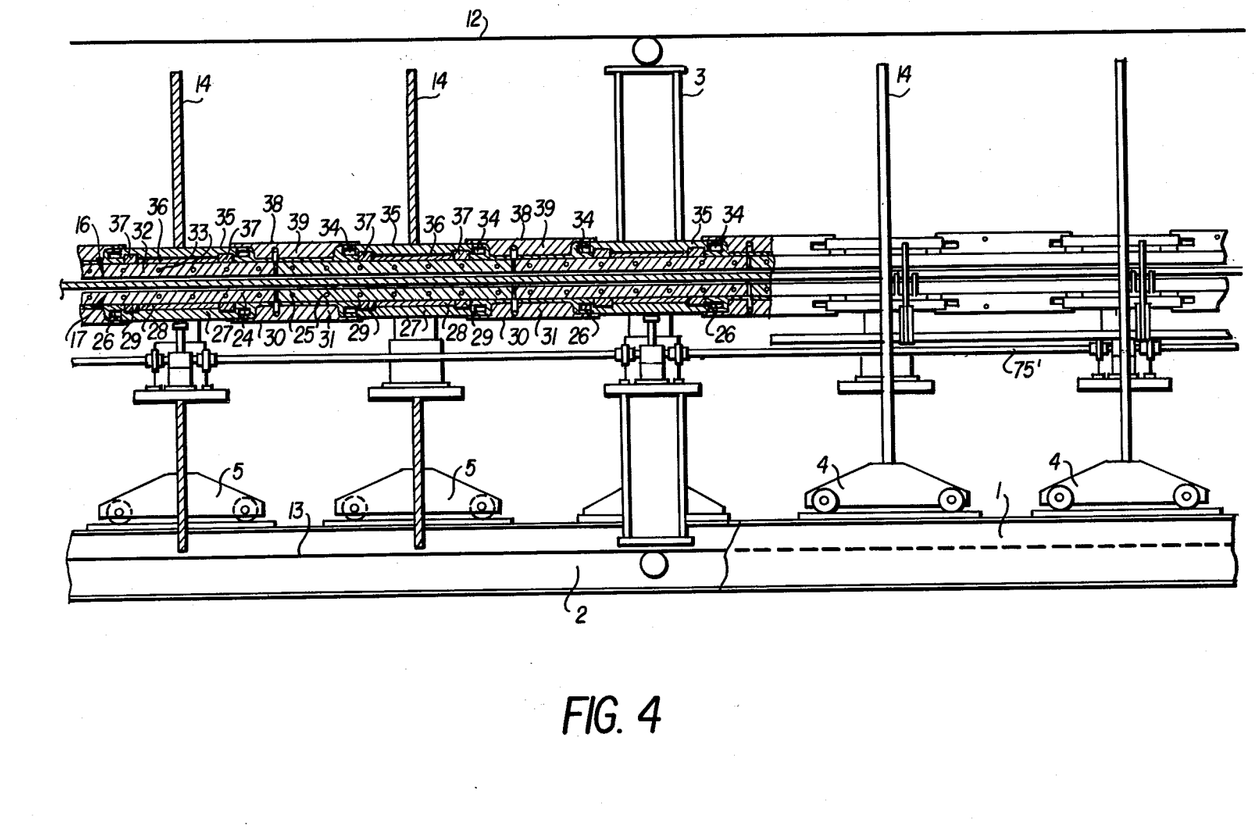
FIG. 4 shows a large scale lateral view of the central tract of the press of the invention showing a small section in detail.

In FIGS 3 and 4, the constructive details of the heated plates 16 and 17 are represented.

As can be seen in FIG. 4, the heated plate 17 is constituted by a slab 24 of metallic material which can be a continuous slab or a slab formed by a plurality of pieces mechanically joined together edge to edge so as to produce a continuous slab. Slab 24 presents on its inside a plurality of cavities 25 through which a hot fluid such as saturated steam is circulated.

Brackets 26 which belong to the sole plates 27 are fixed on the side facing towards the ground of slab 24.

Between the sole plates 27 and the slab 24 there are some closed interspaces 28. Inside these interspaces 28 in correspondence to the brackets 26, there are present some strips 29 of a thermal insulating material which is resistant to compression stresses, for example, fiberglass filaments impregnated with epoxy resins and the like. Moreover, these strips 29 are partially embedded in the sole plates 27.

Adjacent pairs of sole plates 27 are separated from one another by sheets 30 which by their presence create interspaces 31. Both the interspaces 28 as well as the interspaces 31, are filled with thermal insulating material such as, for example, asbestos or the like.

Hot plate 16 has the same structure as hot plate 17 as can be clearly seen from FIG. 3 and FIG. 4.

As a matter of fact, the hot plate 16 is constituted by a slab 32 of metallic material which can be either a continuous slab or a slab formed by a plurality of pieces mechanically joined together edge to edge so as to produce a continuous slab.

Slab 32 presents on its inside a plurality of cavities 33 inside which a hot fluid is made to circulate as, for example, saturated steam.

On the far side of slab 32 with respect to the other hot plate, some brackets 34 belonging to the soles 35, are fixed.

Between the soles 35 and the slab 32 there are some closed interspaces 36. Inside these interspaces 36, in correspondence to the brackets 34 there are present some strips 37 of thermal insulation which is resistant to compression stresses, as, for example, fiber-glass filaments impregnated with epoxy resin and the like. Moreover, these strips 37 are partially embedded in soles 35.

Adjacent pairs of soles 35 are colligated between one another by sheets 38 which by their presence create interspaces 39. Both interspaces 36 as well as the interspaces 39 are filled with thermal insulating material such as, for example, asbestos or the like.

As previously stated the two segments of the looped metallic belts 12 and 13 at their closest point from one another pass between the hot plates 16 and 17.

As can be seen in FIG. 3 the metallic belts 12 and 13 are greater in width than the heated plates.

A sealing element is fixed around the outer edge of each hot plate.

Figure 5:
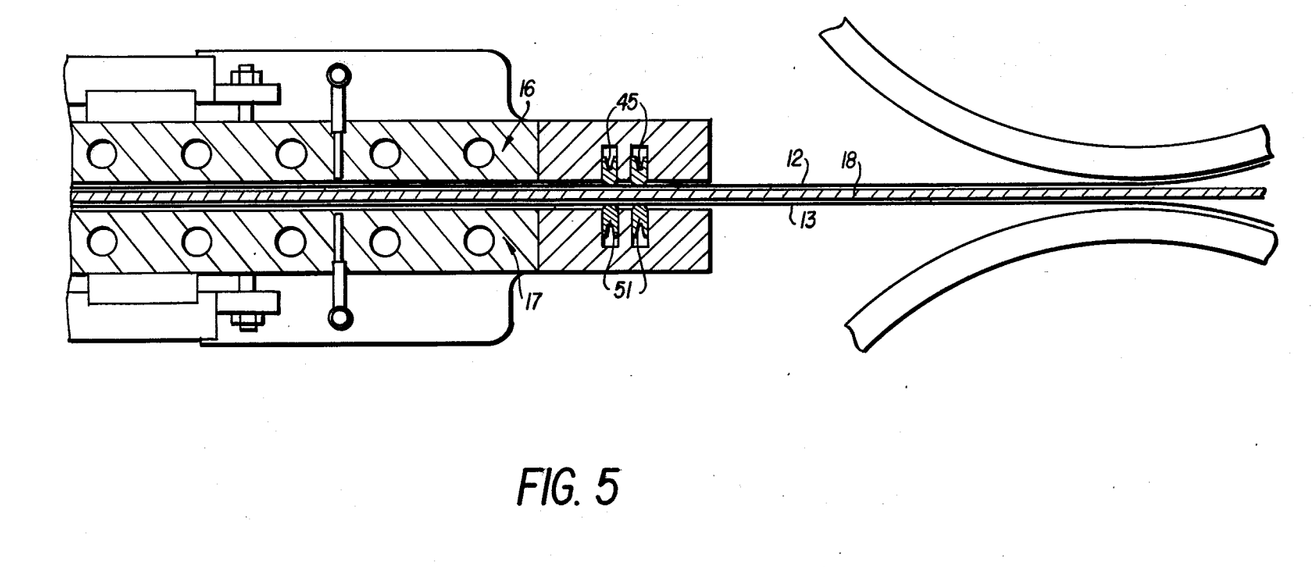
FIG. 5 shows a sectional view of a terminal tract of the platen of the press of the invention.

In particular, hot plate 16 is supplied with a sealing element 40. This sealing element is constituted by a metallic bar 41 which outlines the hot plate 16 laterally as well as forwardly and posteriorly (see FIG. 5) and it is securely fixed to the hot plate.

On its outer side the bar 41 is covered by a layer 42 of thermal insulating material.

In the face of bar 41 which is turned towards the metallic belt 12, two grooves 43 are present parallel to the outlines of the hot plate.

These grooves 43 communicate with a conduit 44 of pressurized air and they house gaskets 45 which are mobile and which project outwards to rest against the metallic belt 12.

Also the hot plate 17 is provided with a sealing element 46 identical to the one previously described.

In fact, this sealing element 46 is constituted by a metallic bar 47 which outlines the hot plate 17 both laterally as well as forwardly and posteriorly (see FIG. 5) and it is securely fixed to the hot plate.

The metallic bar 47 is covered on its outer side by a layer 48 of thermal insulating material.

Two grooves 49 are disposed in the face of bar 47 turned towards the metallic belt 13. Grooves 49 are parallel to each other and parallel to the outlines of the hot plate.

These grooves 49 communicate with a conduit 50 of air under pressure, and they house gaskets 51 which are mobile and which push outwards to rest against the matallic belt 13.

In the space between the hot plates and precisely on the longitudinal edges of the hot plates (and enclosed between the edges of the metallic belts) is a device 52 for accommodating the conveyor belt.

The accommodating device 52 is made up of two bars of rectangular section 53 and 54 united one to the other in a removable way by means of links 55 housed in facing cavities of the two bars 53 and 54 and fixed to the latter by means of pivots 56.

The bar 53 has the same thickness as the conveyor belt to be cured and the bar must be selected according to the dimension of the conveyor belt to be cured.

The bar 54 is external to the hot plate and to the sealing elements present on the outside of the hot plate and it rests on supports 57 which belong to the lower hot plate 17.

In bar 54 there are holes 58 and into each of these is inserted an arm of an oscillating lever belonging to an activating mechanism 59 of the device 52 for accommodating the conveyor belt.

A pair of these actuating mechanisms is provided for each of the frames 14 and 3. An actuating mechanism of the accommodating device comprises an oscillating lever 60, the arm 61 of which lever is inserted into hole 58 while the other arm 62 has an idle roller 63. The oscillating lever is hinged at point 64 to one arm 65 of the two-armed support 66 which is secured to the surface facing towards the ground of the hot plate 17.

The second arm 67 of the two-armed support 66 has a cam 68 which is hinged to a shaft 69. A spring 70 is placed between arm 67 and arm 62.

The description of the hot plates is completed with the indication of the pesence of a plurality of conduits 71 which extend to each of the two facing surfaces of the hot plates and which communicate with conduits 72 of air or fluid under pressure.

Obviously, these sealing elements and their above-described actioning mechanisms must not be considered in any restricted sense, as it is possible for the technician of the art to draw a teaching in a way as to achieve technical equivalents which must be understood to be included in the present invention.

Below hot plate 17 which is a mobile hot plate there are stroke limiting devices 73 each one of these constituted by an internally threaded bushing 74 secured onto the lower side of the opening 15 of the frames 14 and 3 and by a threaded stem 75 provided with a flat head 76.

The threaded stem 75 of the stroke limiting device 73 of frames 14 and 3 are actuated mechanically by a shaft 75'.

Upstream and downstream of the press there are clamping systems for tensioning the conveyor belt to be cured.

Figure 6:
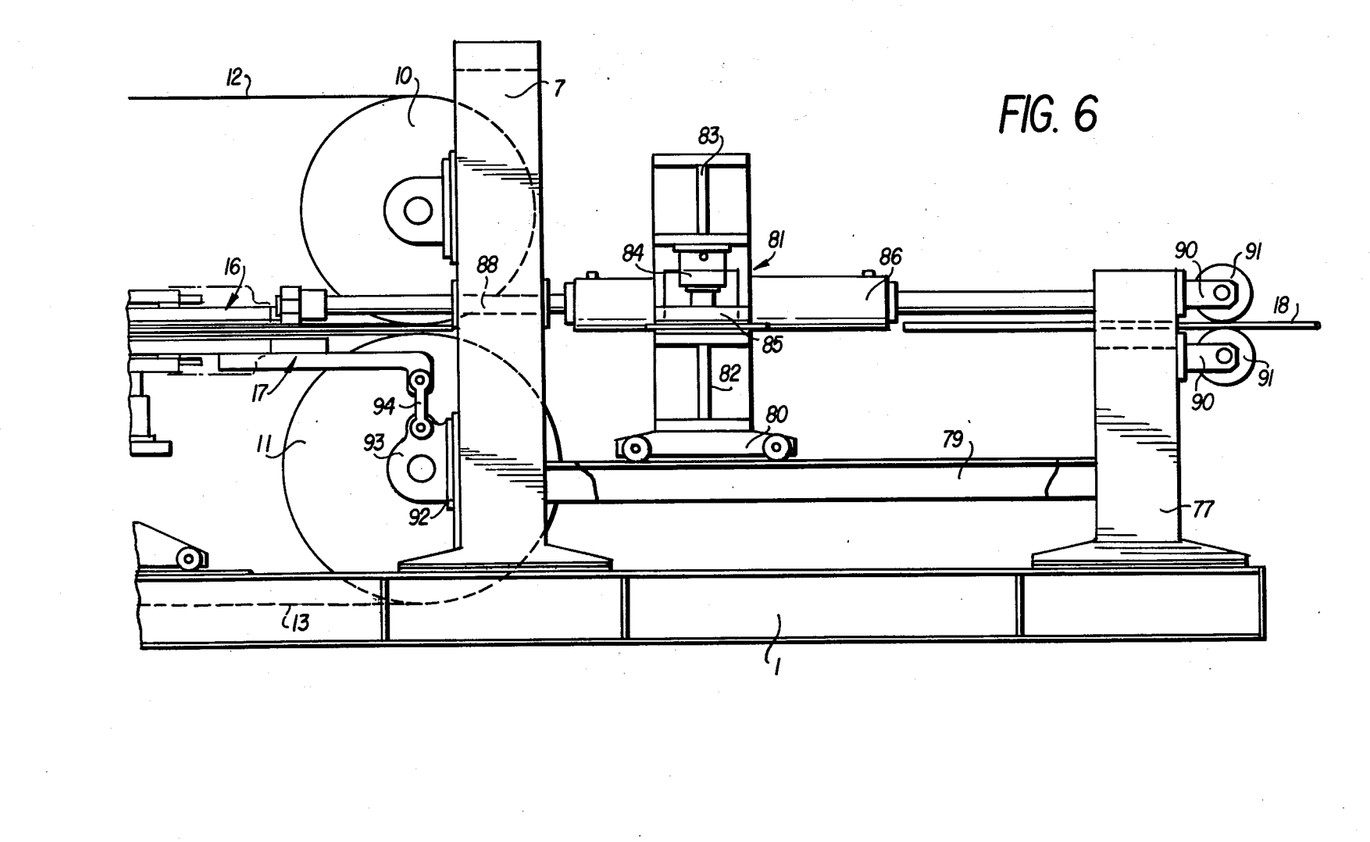
FIG. 6 shows a lateral view of the initial tract of the press with the clamping system with parts removed and parts partially sectioned, the tract of the press and the clamping system being identical to those in the final tract of the press.
Figure 7:
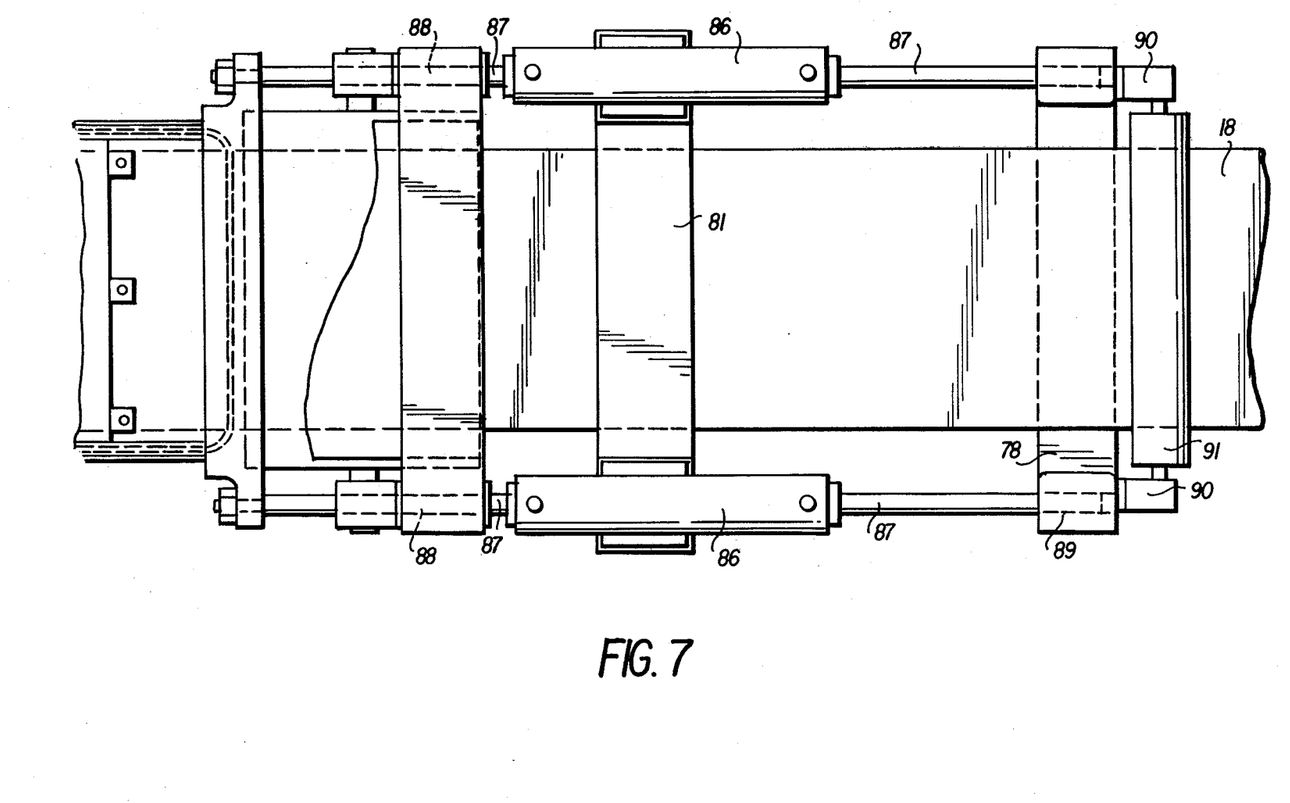
FIG. 7 shows a top-view of the details of FIG. 6.

The clamping system upstream is identical to the clamping system downstream of the press and one of them is represented in FIGS. 6 and 7.

As can be seen in FIGS. 6 and 7 a clamping system according to the present invention is constituted by a frame formed out of two vertical rods 77 fixed to the rails 1 and 2 and one connected to the other by a beam 78.

The vertical rods 77 moreover are connected rigidly to the nearest support of the rollers by the bars 79. The bars act as rails for the trolleys or support members 80 which support the real and proper clamps 81.

The clamps 81 consist of an I-beam 83 rigidly connected to beam 82 which has cylinders with pistons 84. To the pistons 84 is fixed a flat-platen 85 constituting the upper semi-clamp. The ends of the clamp 81 are connected with two double acting hydraulically actuated cylinders 86 whose stems 87 are fixed by one of their extermities to an end of the upper hot plate 16 passing freely inside holes 88 provided in the supports of the rollers and the other end of the stems being freely housed inside holes 89 which are provided in beam 78.

To the vertical rods 77, moreover, are fixed brackets 90 which have rollers 91. The conveyor belt passes between the rollers.

As stated before the supports 6 and 7 support the pairs of idle rollers 8–9 and 10–11, respectively.

The idle rollers 8 and 10 which engage the metallic belt 12 have their rotation shafts fixed to the supports 6 and 7.

The idle rollers 9 and 11 which engage the metallic belt 13 have their rotation shafts fixed to slides 92 to slide along the supports 6 and 7. These slides 92 are provided with supports 93. The ends of the supports 93 are connected by levers 94 hinged to the extremity of the lower hot plate 17.

Moreover (although not represented in the figures), other means known per se to the technician of the art can be used for centrally adjusting the metallic belts inside the entrance zones between the flat-press platens.

In the preceding description of the press of the present invention and in the drawing, no means are indicated for coordinating the movements of the various mechanisms of the press, i.e., means for coordinating:

movements of the cylinder-piston systems;

movements of the upstream and downstream clamping means of the press;

the sending of pressurized air between hot plates and metallic belts; and the functioning of the cam of the actuating mechanism of the lateral device which accommodates the conveyor belt.

These movement coordinating means for the various mechanisms of the press are conventional electric circuits and a technician of the art learning from the following description of how the press works will know how to provide the necessary circuitry.

The press functions in the following way:

The conveyor belt to be cured advances piece by piece between the press platens, the pieces all having equal lengths. The lengths of the pieces will now be defined.

As can be seen in FIG. 1, the press can be ideally divided into three zones of different pressures and indicated with the reference letters "A", "B", and "C".

Zone A of the press is where the "pre-heating phase" of the process of the present invention is actuated. The press cylinders with pistons which exist in this zone exert a pressure between 2 and 3 $kg/cm^2$ on the piece of conveyor belt found between the hot plates in Zone A.

Zone B of the press is where the "formation or molding phase" of the process of the invention is achieved. The press cylinders with pistons which exist in this zone exert a pressure between 6 and 10 $kg/cm^2$ on the piece of conveyor belt found between the hot plates in Zone B.

Zone C of the press is where the "completion of the curing phase" of the process of the invention is achieved. The press cylinders with pistons which exist in this zone exert a pressure between 2 and 3 $kg/cm^2$ on the piece of conveyor belt found between the hot plates in Zone C.

Even though the hot plates 16 and 17 are continuous plates it is possible to exert different pressures in the diverse positions of the same hot plates because the hot plates are flexible, being constructed out of metallic sheets, i.e., of elements which are comparatively much longer than they are thick.

The lengths of Zones "A", "B" and "C" described above differ one from the other and the value of these lengths depends on the time required for executing each of the three phases of the process as actuated by the press.

In order to guarantee that every point of the conveyor belt is subjected to the very same treatment, it is necessary for the length of the conveyor belt piece or section advancing intermittently between the press platens to be the highest common divisor of the lengths of the zones "A", "B" and "C" into which the press is ideally divided.

Moreover, the time during which the hot plates are pressed together, i.e., the time during which the press is "closed", must be equal to the highest common divisor of the execution time required by the three "phases" of the process of the invention.

When this time has elapsed, the pressure is removed from cylinders 20 and pistons 21 move downwardly to detach hot plate 17 from hot plate 16. The excursion of this movement of hot plate 17 is slight being in the order of magnitude of 1 to 2 mm and it is regulated by stroke limiting devices 73.

As a matter of fact during its detaching movement from hot plate 16, the hot plate 17 rests against the flat head 76 of the stroke limiting devices 73. As this movement takes place, cylinders 9 and 11 draw away from cylinders 8 and 10 and during the movement of the former, the slides 92 which hold the end of the rotation shafts slide along the cylinder supports 6 and 7.

Along all four edges of the hot plates and before the hot plates are detached and drawn away from each other, the gaskets 45 and 51 are pushed outwards by the compressed air fed from conduits 44 and 50, respectively, and the gaskets being partially pushed out from grooves 43 and 49, respectively, remain in this position during the opening of the hot plates, the gaskets remaining in contact with the metallic belts 12 and 13 and pressing the metallic belts 12 and 13 along the longitudinal borders of the hot plate against bar 53 of the accommodating device 52.

Along the edges of the hot plates (FIG. 5) where no accommodating device exists, the gaskets 45 and 51 press the metallic belts 12 and 13 against the conveyor belt 18.

Simultaneous to the movement of lowering hot plate 17, hot air or some other pressurized fluid is sent through the conduits 71 into the space existing between each hot plate and the metallic belt guaranteeing in this way that there is no elimination of the pressures on the conveyor belt during the opening up of the hot plates.

In particular, the pressure of air sent between the hot plate and the metallic belt facing it is not less than the vapor tension of the volatile substances present in the elastomeric composition at the temperature of the conveyor belt, such temperature being the curing temperature.

During the lowering of hot plate 17 a lowering of the actuating mechanism of the accommodating device takes place because the actuating mechanism is located on the support 57 fixed to the lower part of hot plate 17.

With the lowering of the actuating mechanism of the accommodating device, the arm 61 of the oscillating lever 60 is moved partially (without moving out however) in the opening 58 of the bar 54.

At this point cam 68 is actuated and this action brings the end of arm 62 of the lever 60 closer to the end of arm 67 of the support 66. This movement is carried out by means of the spring 70.

During the movement arm 62 of lever 60 pivots around the hinge 64 and moves away laterally from the hot plates carrying bar 54 along with it, and thereafter laterally moving bar 53 away.

At this point the clamping systems intervene provoking the advancement of the conveyor belt between the hot plates of the press.

Before this movement takes place, i.e., when the press is still "closed", the real and proper clamps grip the conveyor belt both upstream and downstream of the press and keep it in tension. The upstream clamp of the press (FIG. 1) is found far from support 7 of the rollers 10 and 11 and the downstream clamp of the press is found near to the support 6 of the rollers 8 and 9.

Moreover, the pressure is equal in the double acting cylinders 86 of both the clamping systems downstream and upstream of the press. As the hot plates separate one from the other and the accommodating device of the conveyor belt moves towards the outside, liberating the borders of the conveyor belt, the pressure in the double acting cylinders of the clamping system downstream of the press is increased while the pressure in the double acting cylinders of the clamping system of the press remains constant.

It follows that the downstream clamp moves far from the support 6 of the rollers 8 and 9, and that the upstream clamp of the press moves close to the support 7 of the rollers 10 and 11, and that during this movement the portion of the conveyor belt between the clamping systems is kept under tension. Moreover, during this movement of the clamps, the metallic belts 12 and 13 also move to accompany the conveyor belt in its movement.

As the clamping system downstream of the press is moved by a tract (equal to the highest common divisor of the lengths of the zones "A", "B" and "C") pulling in its movement the upstream clamping system and the conveyor belt between the two clamping systems, the cam 68 comes into action initiating the movement of the end 62 of the oscillating lever 60 away from the end of the arm 67 of the support 66 against the resistance of spring 70, and forcing the arm 61 of the oscillating lever 60 to come closer to the hot plates and to move the accommodating device 52 towards the inside of the space between the hot plates in order that bar 58 of the accommodating device 52 comes into contact with the sides of the conveyor belt 18.

As the accommodating device comes into contact with the sides of the conveyor belt, the hot plate 17 is moved and pushed towards the hot plate 16 by cylinders 20; the pressurized air between each hot plate and the metallic belt facing it is expelled through the conduits 71. The same thing happens to the pressurized air pressing the gaskets 45 and 51 which are made to expel air through the conduits 44 and 50, respectively.

At this point the upstream and the downstream clamps open up and the double acting cylinders 86 rapidly take them back to their starting position. The upstream and the downstream clamps close up again and into the double acting cylinders 86 the same pressure which puts the tract of the conveyor belt between the clamps into tension is brought to bear.

From the above-given description of the press it can be seen that the press performs the process of the present invention. As a matter of fact, the press having flat platens divided into three pressure zones permits the conveyor belt to be cured according to the "phase" sequences of the process which have already been described.

The fact that while employing the press the pressure from one phase to another falls to a lower pressure value is purely contingent on the way the press functions; this accidental fact has not to be considered a "phase" of the process as also the time is insignificant when this occurs.

It has been surprisingly verified that, contrary to what the art teaches, (i.e., that to cure conveyor belts on hot platen presses with pressures lower than 40 kg/cm$^2$ is quite impossible if blisterless conveyor belts are wanted) the process of the present invention and the improved flat platen presses of the present invention produce conveyor belts at low pressure values which are substantially free from defects.

The improved flat platen press which also forms the object of the present invention has other advantages over the known presses.

First and foremost, it is light in weight, this fact being due to its peculiar flat platen frame structure. Since it is of light weight, a smaller quantity of material is required and presses such as these are consequently more economical costwise than the presses of the known types. Moreover, this same factor of being lightweight calls for foundations which are not as robust as those required for the presses of the known types. This consideration also contributes to the low cost of the press.

Still another advantage of this press of the present invention is constituted by the fact that thermal expansions of the press are free to occur since, with the exception of the central one, all of the frames of the press are mounted on trolleys, and all the collateral devices of the real and proper press, such as rollers of the metallic belts and clamps, are connected to the press platens by joints which allow for a certain degree of freedom.

This arrangement of the press elements saves the requisite of certain aritifices employed in presses of the known type for preventing distortions, but which at the same time, have the disadvantage of adding to the weight of the presses.

A further advantage of the press of the invention is that of the press being completely automatic in its function, namely that unlike presses of the known types, it does not require any manual intervention (each time the press opens) for detaching the conveyor belt from the platen before allowing it to move on, or any anti-adhesive treatment applied to the entrance zones of the press.

Although particular embodiments of the present invention have been illustrated and described, it is to be understood that the present invention includes in its scope any other alternative embodiment accessible to the technician of the art. In particular, the present invention is intended to include the provision of cooling tracts on the upstream ends of the press flat platens.

Moreover, the present invention is intended to include in its scope the solution that in the three zones into which the press is ideally divided, the temperature differs.

What is claimed is:

1. A process for curing conveyor belts and the like made out of an elastomeric composition containing volatile substances which comprises the three steps of
   (1) heating said conveyor belt to the curing temperature of the elastomeric composition, subjecting it to a pressure less than 6 kg/cm² and at least equal to the vapor tension of the volatile substances present in said elastomeric composition while at the curing temperature until the crude elastomeric composition plastifies without significant bubble formation,
   (2) maintaining the conveyor belt at the curing temperature of the elastomeric composition, increasing the applied pressure to a valve between 6 and 10 kg/cm², and molding the elastomeric composition of the conveyor belt without provoking any danger of alterations in the arrangement of the structure of the conveyor belt itself, and
   (3) while still maintaining the conveyor belt at the curing temperature of the elastomeric composition, subjecting said conveyor belt to a pressure of less than 6 kg/cm² but not less than the vapor tension of the volatile substances present in the said elastomeric composition until the curing of the elastomeric composition of the conveyor belt is completed.

2. The process of claim 1 wherein the pressures applied in the step where the plastification of the elastomeric composition takes place and the pressure applied during the completion of the curing phase are about equal to the vapor tension of the volatile substances present in the elastomeric composition.

3. Process according to claim 1 wherein the pressure, while increasing from a value about equal to the vapor tension at the curing temperature of the volatile substances present in the composition, reaches a value between 6 and 10 kg/cm², and then, in decreasing again to the preceding pressure, is in charted steps which represent tracts at a constant pressure.

4. Process according to claim 1 wherein the pressure, while increasing in value from the vapor tension of the volatile substances of the compound at the curing temperature, reaches a value between 6 and 10 kg/cm² and then, in deceasing to the preceding pressure value, is in a charted graphical line which increases linearly from the pressure equal to the vapor tension of the volatile substances in said elastomeric compound at the curing temperature until the value between 6 and 10 kg/cm² where it remains constant for a tract, and then decreases linearly until a pressure value equal to the vapor tension of the volatile substance of the compound at the curing temperature is reached.

5. The process of claim 1, wherein the pressure in step (a) is from about 2 to about 3 kg/cm².

6. The process of claim 1, wherein the pressure in step (c) is from about 2 to about 3 kg/cm².

* * * * *

UNITED STATES PATENT AND TRADEMARK OFFICE
CERTIFICATE OF CORRECTION

PATENT NO. : 4,115,510
DATED : September 19, 1978
INVENTOR(S) : AUGUSTO PREVIATI It is certified that error appears in the above-identified patent and that said Letters Patent are hereby corrected as shown below:

In the specification, Column 1, line 53, after "flat-platen" insert -- press --.

Column 3, line 37, delete "scond" and insert -- second --.

Column 5, line 19, delete "fiberglass" and insert -- fiber-glass --.

Column 6, line 2, after "parallel" insert -- to each other and parallel --;

Column 6, line 23, delete "matallic" and insert -- metallic --.

Column 7, line 46, delete "per se" and insert -- *per se* --.

Column 11, line 35, delete "valve" and insert -- value --.

Signed and Sealed this

Twelfth Day of June 1979

[SEAL]

Attest:

RUTH C. MASON
Attesting Officer

DONALD W. BANNER
Commissioner of Patents and Trademarks